(12) United States Patent
Binns

(10) Patent No.: US 10,562,158 B1
(45) Date of Patent: Feb. 18, 2020

(54) SELF-LOCKING FASTENER SYSTEM AND PROCESS

(71) Applicant: Lloyd S. Binns, Avon Park, FL (US)

(72) Inventor: Lloyd S. Binns, Avon Park, FL (US)

(73) Assignee: Tammy Denise Binns, Fort Lauderdale, FL (US)

( * ) Notice: Subject to any disclaimer, the term of this patent is extended or adjusted under 35 U.S.C. 154(b) by 0 days.

(21) Appl. No.: 15/635,533

(22) Filed: Jun. 28, 2017

Related U.S. Application Data

(60) Provisional application No. 62/357,805, filed on Jul. 1, 2016.

(51) Int. Cl.
  *B25B 13/10* (2006.01)
  *F16B 35/04* (2006.01)
  *B25B 21/00* (2006.01)

(52) U.S. Cl.
  CPC .......... *B25B 13/102* (2013.01); *F16B 35/045* (2013.01); *B25B 21/00* (2013.01)

(58) Field of Classification Search
  CPC ....... B25B 13/06; B25B 13/48; B25B 13/102; B25B 21/00; B25B 23/1405; B25B 27/14; B25B 21/002; F16B 35/045; F16B 39/025; F16B 39/106; F16B 39/22; F16B 39/284
  USPC .......................................................... 81/52
  See application file for complete search history.

(56) References Cited

U.S. PATENT DOCUMENTS

| | | | | |
|---|---|---|---|---|
| 5,692,419 A | * | 12/1997 | Binns | B25B 13/48 411/281 |
| 7,308,842 B2 | * | 12/2007 | Hufnagl | B25B 23/1415 411/43 |
| 9,132,531 B2 | * | 9/2015 | Merrick | B25B 13/50 |
| 9,671,315 B2 | * | 6/2017 | Smith | G01M 99/00 |
| 2011/0048182 A1 | * | 3/2011 | Goss | B25B 13/065 81/478 |

* cited by examiner

*Primary Examiner* — Orlando E Aviles
*Assistant Examiner* — Thomas Raymond Rodgers
(74) *Attorney, Agent, or Firm* — Knobbe, Martens, Olson & Bear LLP

(57) ABSTRACT

A threaded fastener, inserted into a hole in materials to be joined, receives a free-running collar (nut) with out-of-round duplex barrels. Spring-loaded twin sockets cradle the barrels and a restraining polygon key extends through the sockets and into a recess in the small face on the pin tail. Installation advances in tandem sequence; tightening before swaging. A machined groove with flat bottom and side rising at about 20 degrees from axial forms a boundary and partly reshapes crests from parallel to angular. Such inclination keeps the collar connected to the cavity of the larger of twin sockets throughout tangential tightening, rise of torque, displacement of crest material, recoil of the smaller socket on the end barrel, cessation of collar rotation and plunging torque. When recoil ends, radial torque on the smaller socket crushes and locks barrel material into underlying left hand helical troughs that interrupt the last few pin threads.

8 Claims, 12 Drawing Sheets

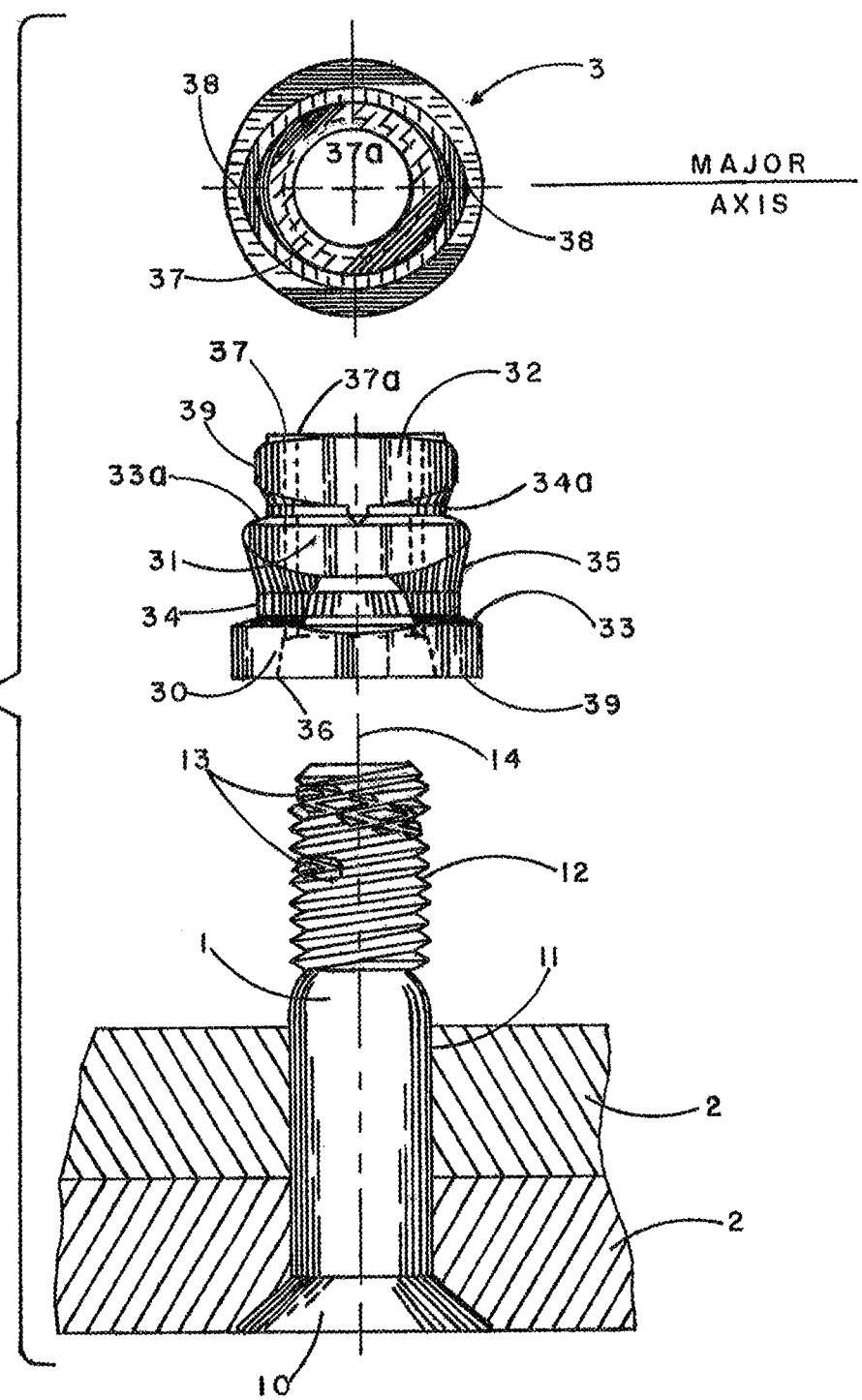

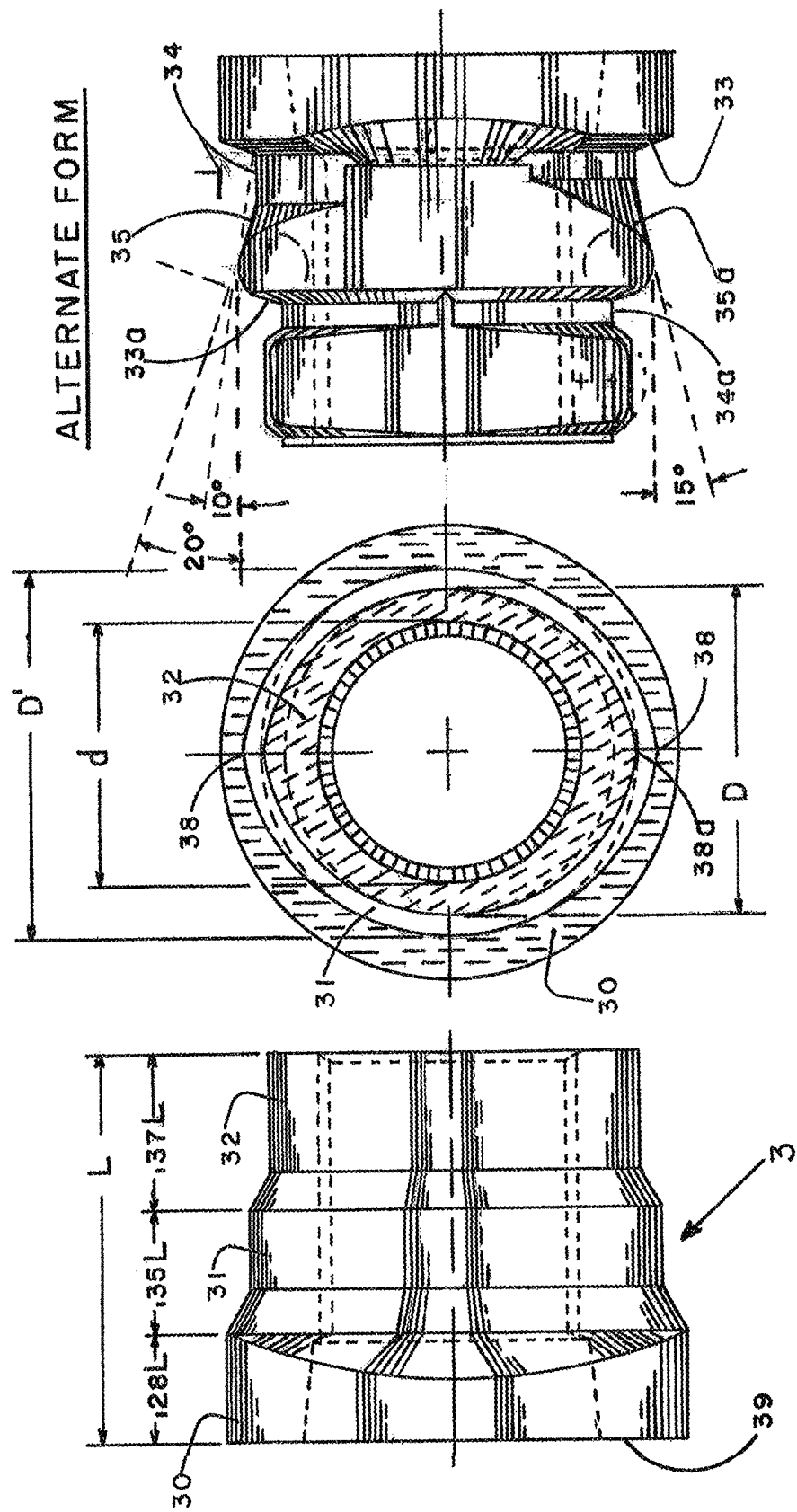

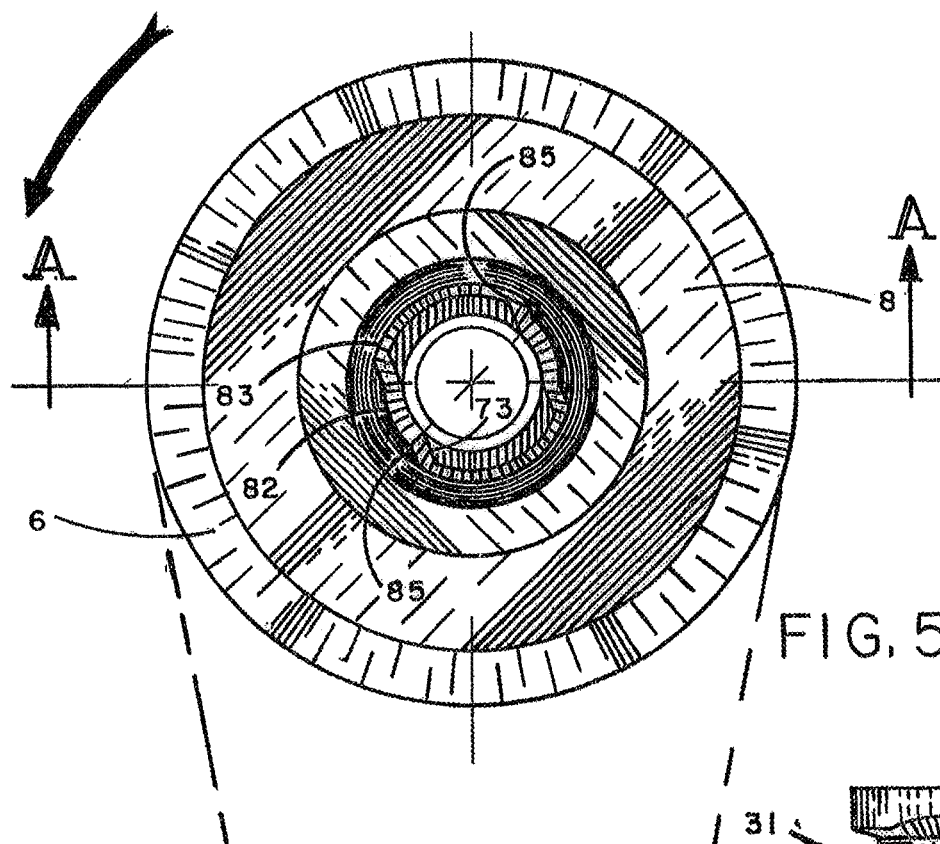
FIG. 5a
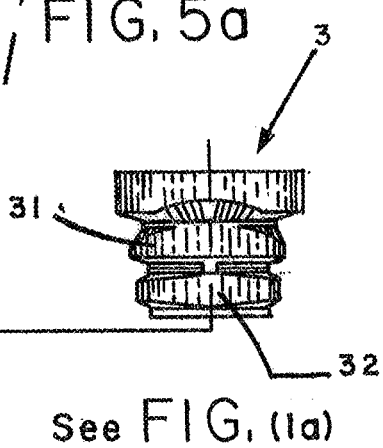
See FIG. (1a)
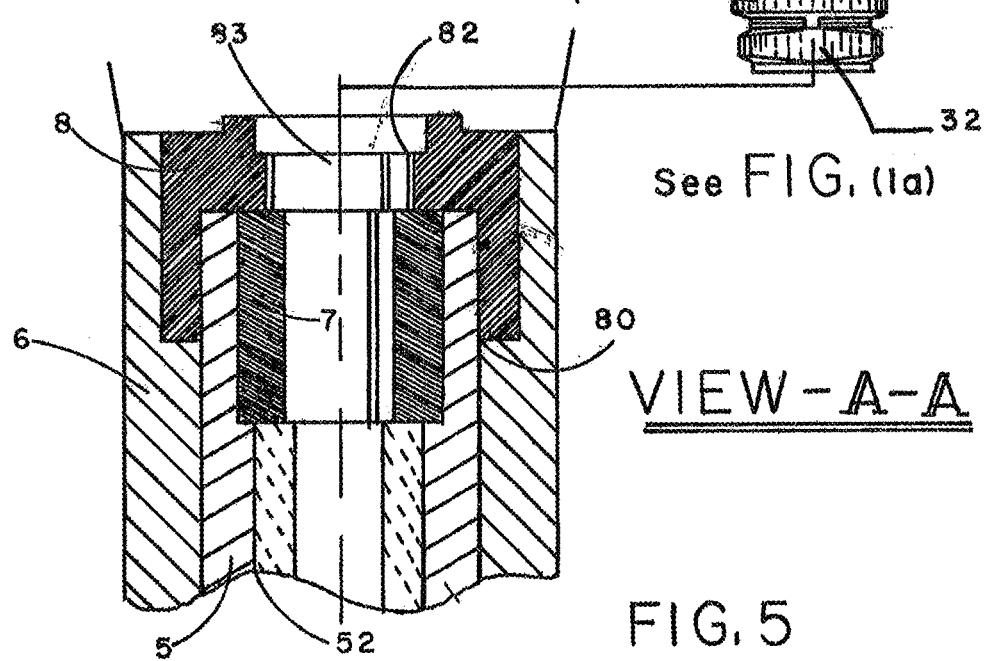
VIEW-A-A
FIG. 5

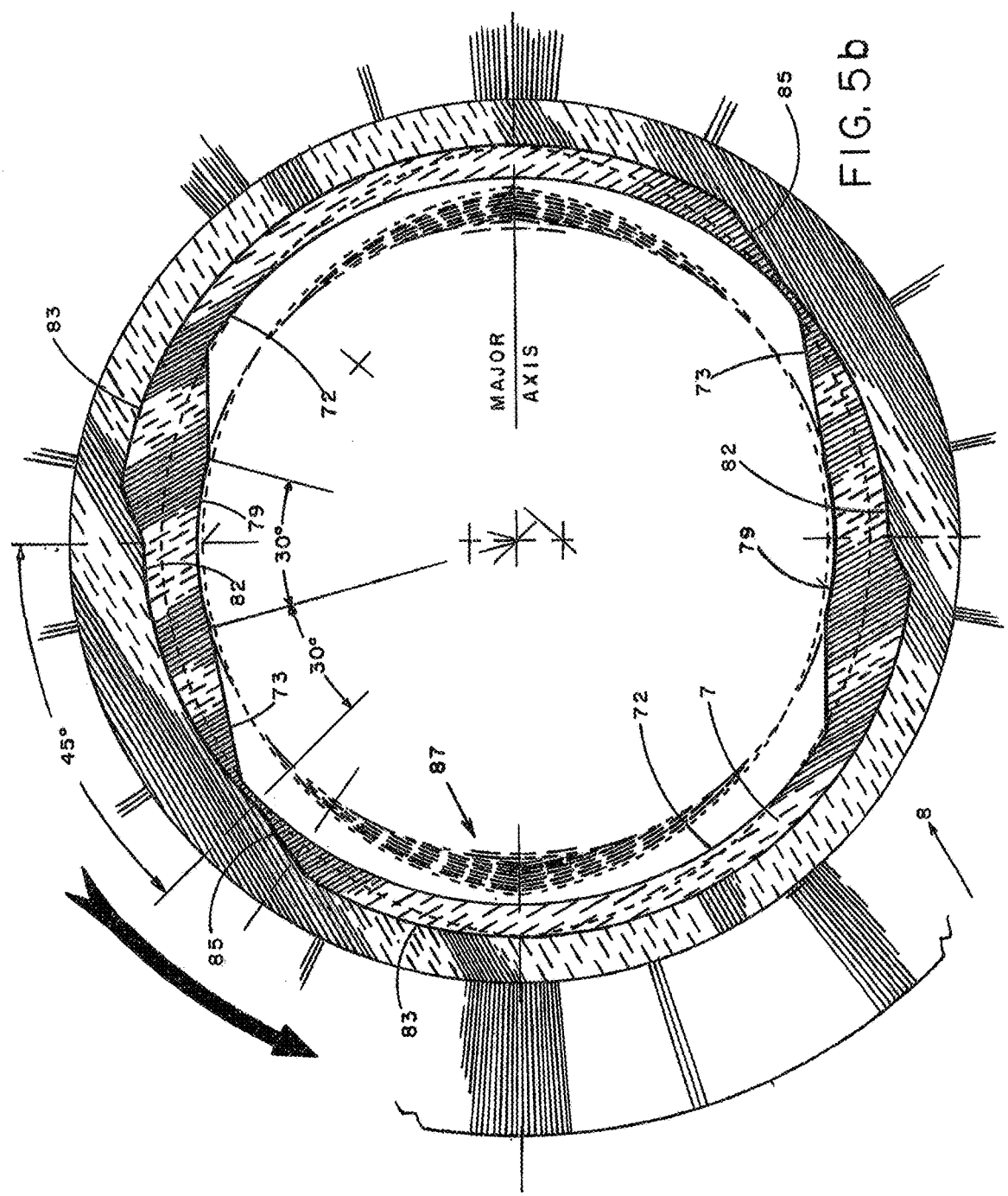

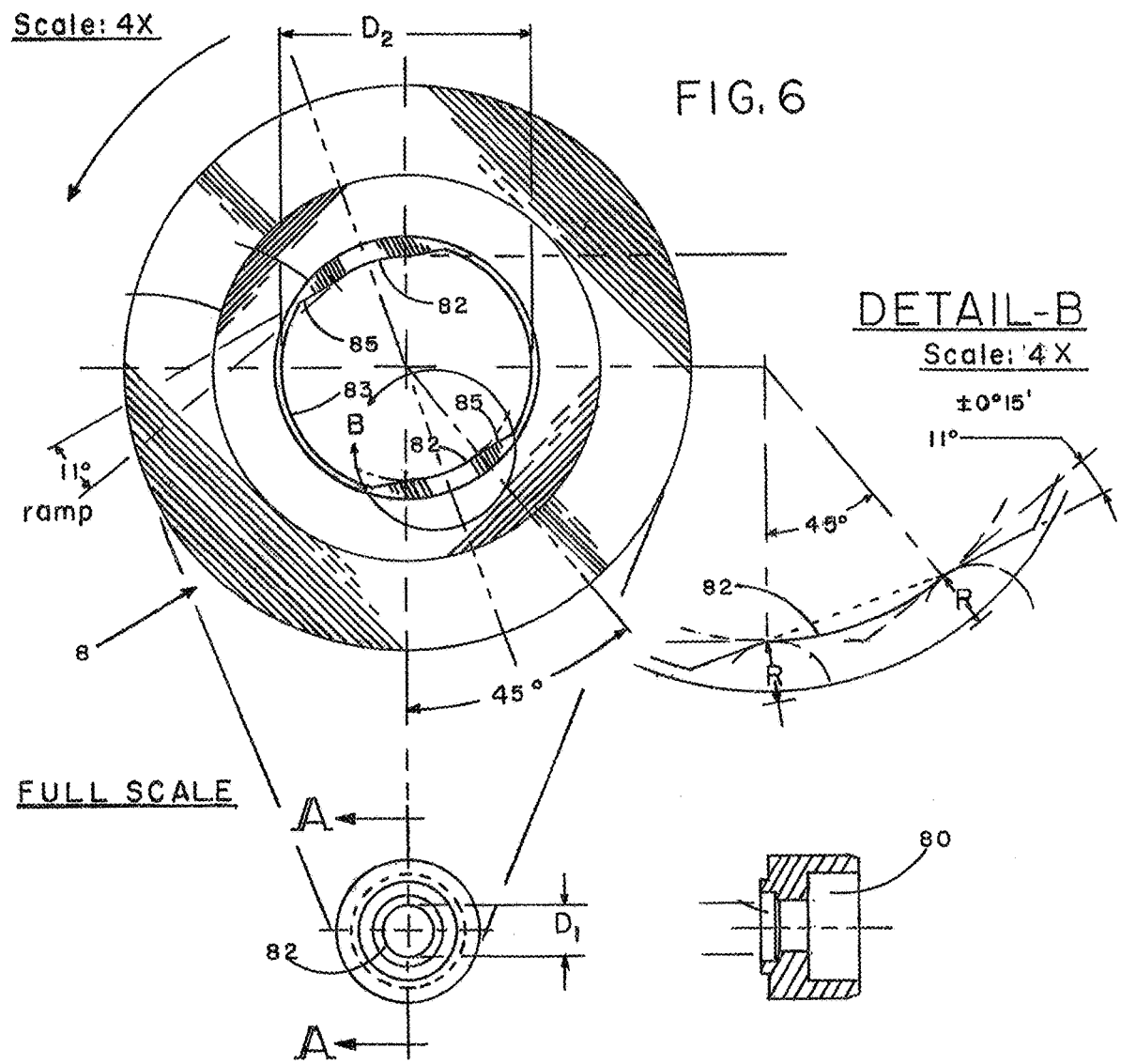

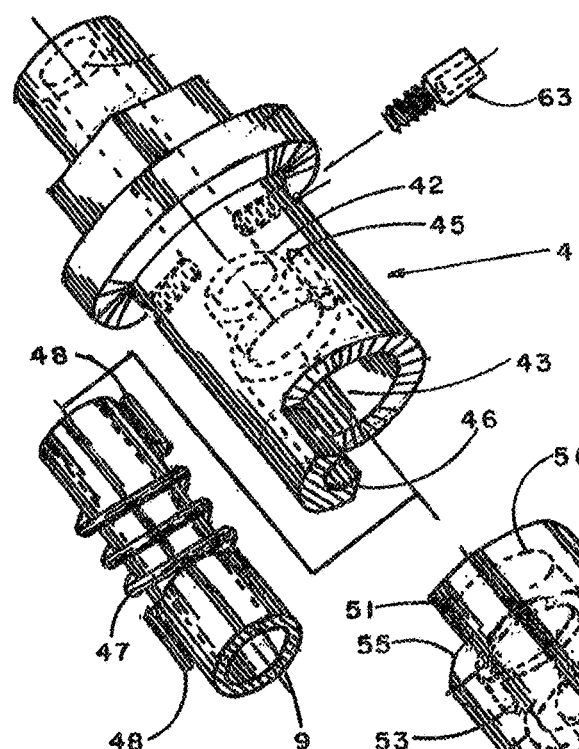
FIG. 7
FIG. 7a
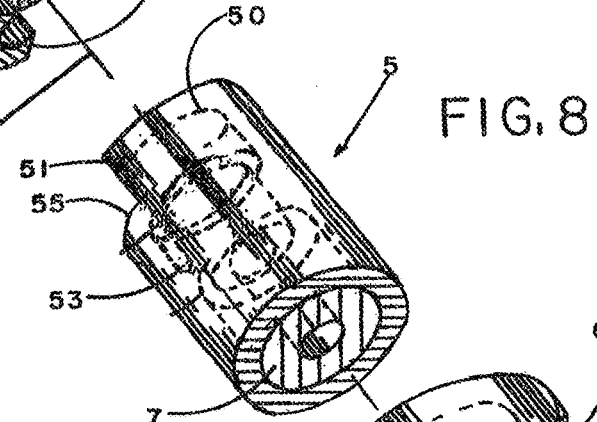
FIG. 8
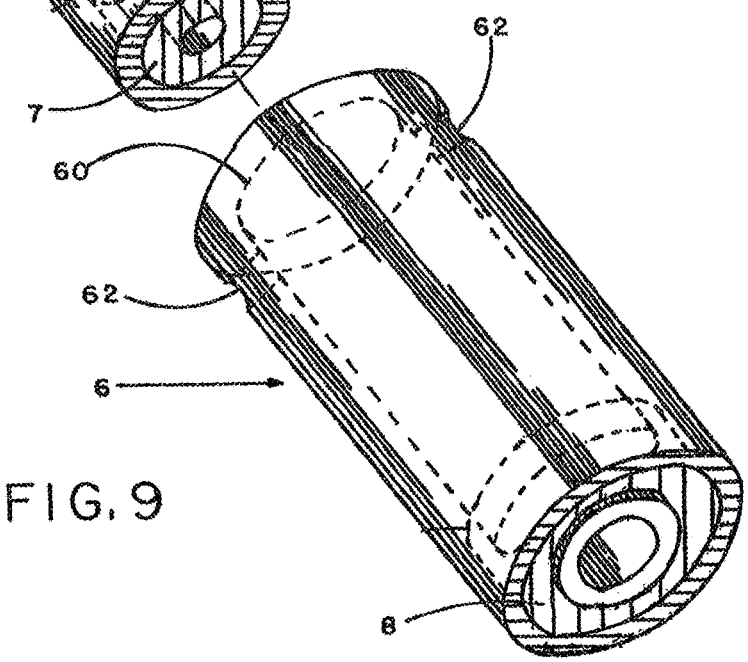
FIG. 9

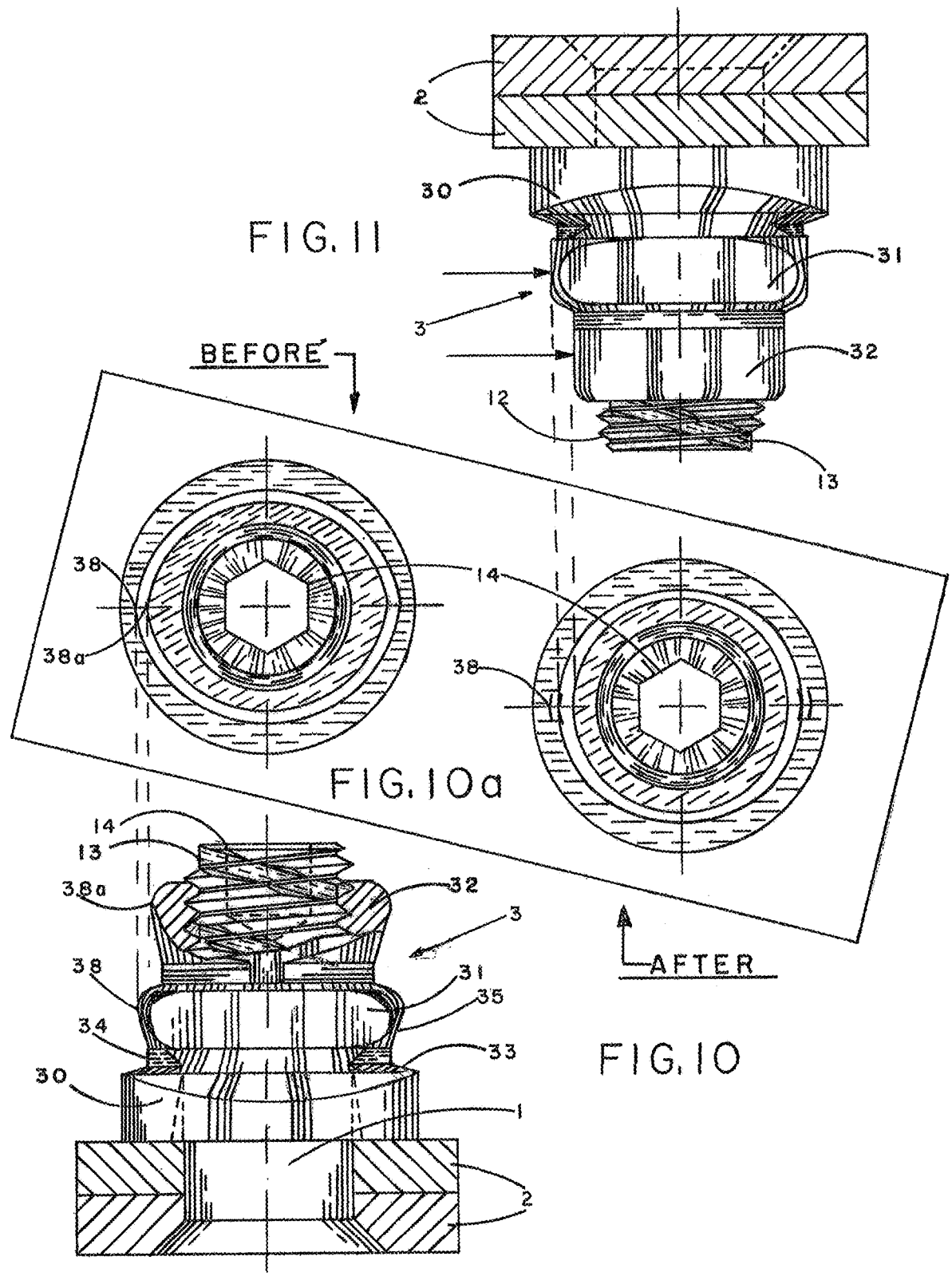

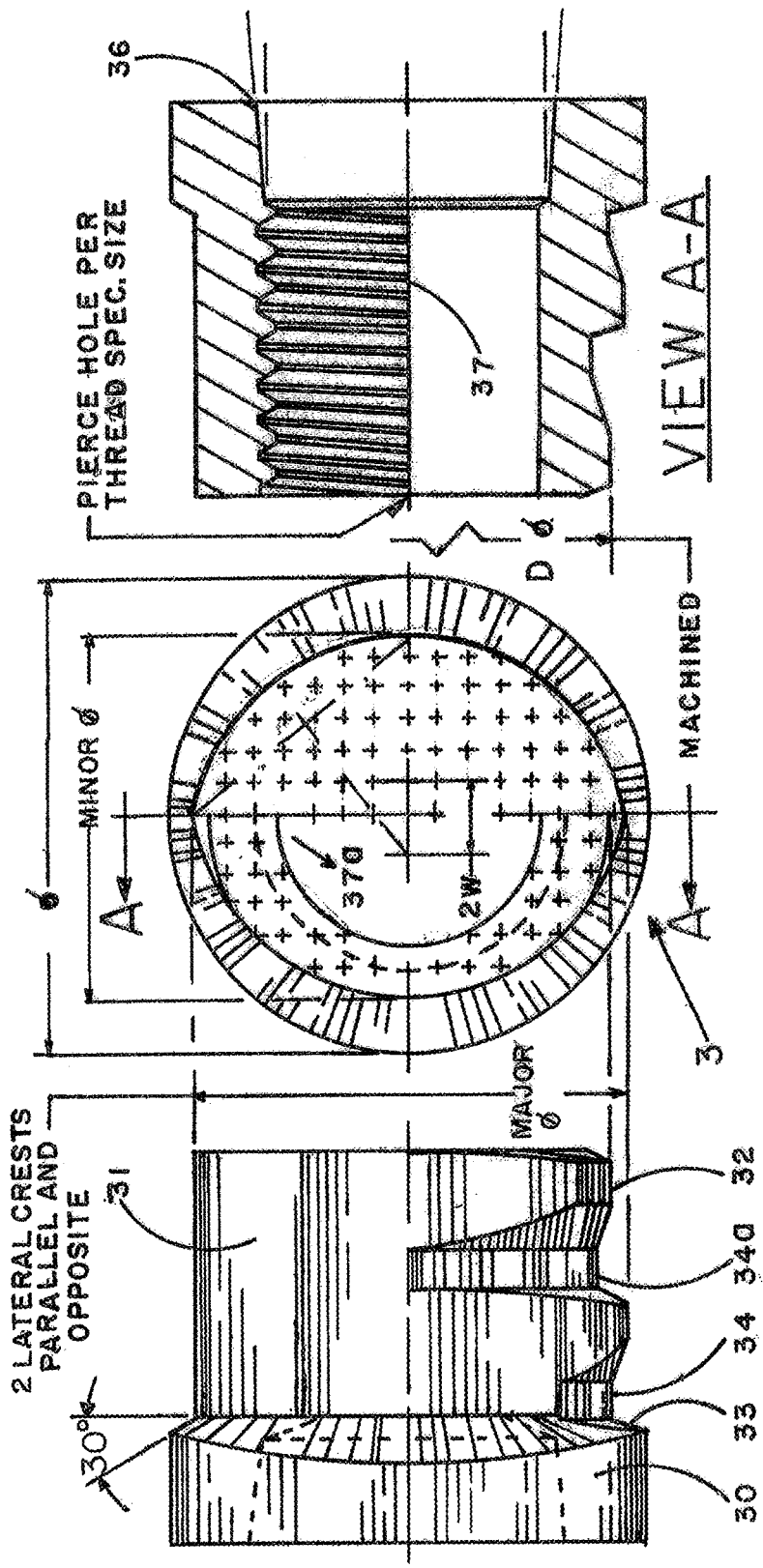

SELF-LOCKING FASTENER SYSTEM AND PROCESS

CROSS-REFERENCE TO RELATED APPLICATIONS

This application claims the benefit of U.S. Provisional Application No. 62/357,805, filed Jul. 1, 2016 and titled SELF-LOCKING FASTENER SYSTEM AND PROCESS, the entire contents of which are hereby incorporated by reference and should be considered a part of this specification, and which is appended herein as an Appendix.

BACKGROUND OF THE INVENTION

Field

The present invention relates generally to the field of mechanical fasteners consisting of a threaded and fluted pin, fitted into a hole to secure materials by the rotary action of a socket that winds a collar onto the pin. Installation is from one side and a recess, shaped into the small face end of the pintail of typical art, accepts a restraining hexagon key centered and fixed within the socket tool. Intervening materials are clamped together and at a predetermined tightness a driving element of the collar twists off at a frangible neck. Ordinarily, the operation should be unremarkable. Latent friction between the head of a standard pin and a workpiece is sufficient to arrest the pin, but pre-locking the assembly from the start, with a collar that is not free running onto the pin threads, causes sporadic failure of the hex key. Effort to improve the system has paid off with only limited success so the search continues.

Description of the Related Art

Edgar Stencel was first to offer a free running collar to eliminate frictional drag that limits the Wing collar of U.S. Pat. No. 3,390,906. Such collar has a circular neck of material between a permanent forward portion and a driving end that twists off at a predetermined torque. Mechanically deforming the neck creates thread friction as a means to lock collar to pin but the Stencel alternative operates on chance. Three axial ribs, equally spaced on the Stencel collar, play hide-and-seek with six axial flutes interrupting the last few pin threads; therefore, alignment of ribs and grooves at the instant of locking is uncertain. Prematurely marketed the system was soon withdrawn and replaced by the Eddie-bolt-II that reduces the pin flutes from six to five and removes the gamble. But collar ribs still play their double role to drive the rotating collar and then to collapse axially into longitudinal pin flutes. The switch of functions happens during a very small time increment wherein the hoop form of the collar is compressed and material yields elastically to caress the underlying pin threads. Most of the time the millisecond event goes unnoticed but at times the collar may not have come to a full stop and with caress turning to grab the captivated pin overstrains the hex key to sporadic failure.

Assembly lines in factories that build airframes then may be shut down to drill out and replace faulty installations at increased cost. But there is more to blame for inflated cost than the momentary, transitional, elastic yielding of collar rib material between tightening and locking. New aircrafts are increasingly built of synthetic composite materials that are brittle and liquid seals joints require coating clearance fit holes and pins with a sealant. Such coating, then acting like a lubricant, farther reduces friction beyond the counter-torque capacity of the hex key. Replacing the hex key with a spline shaped substitute shows improvement but the Stencel "deltoid" socket continues unchanged and the overall requirement for shear application still exceeds the scope of existing art.

A well-aimed, but narrow, solution by Wallace for the persistent mechanic problems will then serve as springboard into the present invention. His patent of U.S. Pat. No. 4,601,623 offers a collar with two working barrel portions—a middle portion hexagon shaped for tightening and a smaller end portion elliptic for locking. Installation requires two separate operations—a first socket tool to tighten the middle barrel of the collar and then laid aside and followed with an oval shaped socket to swage the end barrel into axial flutes on the pintail. Aircraft engineers, however, reject the increased cost to double the installation process. They also envision unintentional overlook of the locking operation and a nightmare of fasteners unwinding and airplanes falling apart in flight.

Persistent research, but with doubtful improvement, obtained U.S. Pat. No. 5,145,300 showing a collar with elliptic barrels stepped and driven by a singular socket with stepped cavity. Slightly larger than the end barrel the middle collar barrel receives the larger socket cavity and the smaller cavity cradles the end barrel. But like the Stencel socket, tightening and locking advance simultaneously rather than sequential and moreover, the socket prematurely cams-off from the collar without fulfilling the task. An improved socket with flat surfaces adjoining slanted ridges proves redemptive and U.S. Pat. No. 5,692,419 was granted. But although tool and collar stay connected to complete the installation tasks specific advantage could not be claimed. Nevertheless, the greater advancement of the current invention comes from smart twin sockets that cradle duplex collar barrels, rather than from changing the polygon-sided key for another design of complicated form. But to get those sockets to work in quick succession for a continuous operation would be laborious.

So the continuing need eventually produces a self-locking fastener system that:
1. Nullifies the problem of transitional radial, elastic yielding of collar material so that the rotating collar will not grab the pin to over-burden a restraining polygon-sided key.
2. Does not distort the hoop form of the collar during tightening.
3. Avoids tool "cam-off" when installing the fastener.
4. Reconfigures the hexagon shaped recess in the tail end face of the pin for a pentagon profile that will withstand elevated pressure, but without over-enlarging the drilled hole that facilitates the broaching operation.
5. Provides a collar that pre-production testing may find it needful to make, on the manufacturing floor, small adjustments of length or angle to suit differences of material grade or variations from one material heat to another.
6. Postpones the locking event until plunging torque signals tightening completed by using spring-loaded twin sockets working in tandem sequence on duplex collar barrels.
7. And offers a reliable self-inspecting method relieving airframe manufacturers of the dread that improperly installed fasteners may slip by unnoticed.

DESCRIPTION OF THE PREFERRED EMBODIMENT

The fastener system of the current invention improves prior art and includes a free running collar with deformable duplex barrel portions, a pin with a helical locking trough, and a reconfigured polygon recess in the pintail face end to receive a complimentary key fixed within unique spring-loaded twin sockets of a tool. Of the present invention the pin has a head on one end of a shank and threads are on the other end. A continuous full turn of at least one helical locking trough crisscrosses the last few pin threads with trough and threads advancing in opposite directions; left hand trough crossing right hand threads and vice versa.

The internally threaded collar has three integral portions; a forward and larger circular portion is attached to an intermediate sized barrel portion that is out-of-round and steps down to a smaller end portion. Both middle and end barrels each can be described as constructed of two arcuate sides of material that are of equal lengths and meeting at crests, die-formed axially parallel but lightly machined at 20 or 15 degrees opening rearward. A resulting flat bottomed groove soon angles upward to meet the crest so that each barrel is distinct and a companion shoulder, forward of each groove, is angled at about 20 degrees from radial.

Each of spring-loaded twin sockets has a circular cavity interrupted and divided into opposite arcs preceded by ramps. Sockets cradle duplex collar barrels to apply force and they work in tandem fashion. The larger socket first engages crest material on the larger of the duplex barrel and rotates the smooth collar threads onto the pin inserted into a hole in materials to be joined. Then as the collar grows increasingly resistant, after contacting the workpiece, the advancing socket displaces rearward, as well as circumferential, material from the machine slanted collar crests. Thus the tool stays on, material "cams-off," and the smaller socket recoils.

But the advantages of machining are multiple. Pre-production lot test may alert a technician to make last minute alteration of the angled collar barrel crests so as to correct fluctuation of joint tightness arising from material grade change or difference from one production lot to another. Moreover, the angled collar crests help to preserve a protective dry film coating by causing displaced material to flow a shorter distance, partly rearward, instead of travelling the full circular path around the apex of the out-of-round collar. The diameter of the larger socket cavity establishes how much crest material will be displaced from the ends of the major axis of the middle collar barrel to obtain a desired preload, but without distorting the hoop form. Likewise, the cavity diameter of the smaller socket determines how much end barrel material must be rounded off so as to lock collar to pin.

The inclined angle of each ramp forward of a socket cavity supports function. An angle between 12 and 15 degrees, for the ramp on the larger cavity, raises tangential torque for tightening and about six degrees inclination for the ramp on the smaller cavity augments radial torque for swaging. Proportion also supports function and the shallow locking trough on the pin is notable for its shape, width, continuous length and coarse pitch. Not less than one full turn of a left-hand helical locking trough crisscrosses and truncates the last few right hand threads on the end of the pin shank and the pitch, "P," of the trough is a whole number that is much coarser as compared to the thread pitch. For example; based on the experimental plan for the 0.250-28 size fastener the trough pitch is calculated as follows:

$P=28/K=7$ where "$K$" is the number 4

Slanting side walls flanking the trough are similar to the lay of the pin threads and the root width is about equal to one-half of a standard thread pitch. Hardened pin threads are truncated by the trough to a fraction of their height and a recess in the face end of the pintail accepts a pentagon-sided key that emerges from the tightening event carrying a manageable demand for counter-torque.

Appropriate torque still to be applied onto the end barrel, when the smaller socket ceases to recoil, is limited to prevent the stalled collar from returning to life. By design, the radial force component of the second torque is elevated and the tangential diminished. The objectives are for the smaller socket to crush end barrel material, relax tension and shift forward all thread portions under compression within a barrel now being converted to roundness. Thread portions straddling the locking trough also will be bloated to secure collar to pin and if vibration tested the resulting disarray resists effort to unwind the locked collar. Such improvements then qualify the system to be used on airframes that operate in both subsonic and supersonic environments.

OBJECTS OF THE INVENTION

Operations, so far, have been a collection of single events but it takes three cooperating installation tool sub-assemblies, working together, to execute recoil: (1) an adapter step-bored on the forward end to provide chambers for a spring surrounding a hollow mandrel, (2) an internal socket sub-assembly and (3) an external socket assembly. But the mandrel is exchangeable for a cage that houses the pentagon key of the tool.

The general objectives of this invention are twofold: (1) to solve nagging hex key failure, peculiar to this type of fastener, by managing installation forces and not just by abandoning the hex key (simply changing the hexagon shape for another concept is not a major solution) and (2) to accomplish installation in two clearly separated but continuous steps; first tightening and then locking.

Engineered response to the first objective works to manage metallurgical forces burdening the traditional hex key but proper replacement designs for the pintail recess may be multiple and complicated. The second objective responds to the prolonged use of thread friction as a means to pre-lock collar to pin so that a collar of prior art is not free running and, thereby, is like "putting the cart before the horse."

Specific Objectives

A first specific objective for mass-producing the pin that improves prior art is to form the new trough by machining or thread-rolling rather than by grinding. A continuous helical trough eliminates the rotational peek-a-boo game that axial pin grooves play with longitudinal collar ribs.

A second specific objective is to provide a collar with three barrel portions that can be manufactured economically. The typical collar has a forward and larger circular portion integrated to a duplex body portion that is stepped and out-of-round and the middle barrel is larger than the end barrel. A shallow flat-bottomed groove, machined between the collar segments, then makes each barrel distinct but unlike the original collar the grooves do not define a frangible twist-off portion to be collected and discarded.

A third specific objective is to machine the axial crests of the stepped barrel from parallel to angular and opening rearward at 20 or 15 degrees. Machining then offers, (a) flexibility to alter dimensions at the time of manufacture so as to enhance joint tightness that may vary when material changes or from one production lot to another, (b) good sense to change the die-formed shape of the collar crests from parallel to angular, preventing socket "cam-off" and assuring that the tightening operation will be completed, (c) set up a plan to send displaced socket material flowing a shorter axial route rearward as well as circular instead of going the full circular path around the ends of the major axis and thereby, (d) to conserve a dry film coating that protects the collar surface.

A fourth specific objective is to set the fastener by engaging duplex collar barrels with novel twin sockets operating cooperatively in tandem fashion. Installation advances as the larger of twin sockets, with increasing tangential torque, progressively works the middle barrel on a collar that grows reluctant, slows down and loses crest material.

A fifth specific objective is to allow the smaller spring-loaded socket on the end barrel to recoil as the rotating collar, increasingly resistant, stalls at maximum force and torque dips to frictional value.

A sixth specific objective is to lock pin to collar. At the end of recoil the smaller socket, with decreased tangential and increased radial torque, compresses end barrel material relaxing and urging underlying thread portions forward. Such actions create noticeable gaps rearward of the hardened pin threads and the tips of the ductile collar threads roll forward like waves of the sea but do not break over. Collar thread portions, straddling the pin trough and bulging laterally, are imprinted by the truncated pin thread stumps remaining in the shallow locking trough and the total disarray locks pin to a collar that resists unwinding by vibrational forces.

Finally, a seventh specific objective is to include reliable self-inspecting evidence that each fastener is properly installed and meets specification. Swaging pressure is not the only force acting on the nut threads. When swaging begins the tightened collar is already under tension that wants to pull the collar threads forward but they resist with a force that is equal and opposite. Radical swaging then upsets the equilibrium, deforming and axially shifting the relevant collar thread portions forward to relieve tension. At such stage the socket tool will have rotated about 180 degrees relative to the collar surface and the rounded diameter of the end barrel portion of the collar is larger than that of a circle that can be inscribed to touch the former intercrest bottoms.

Each collar barrel also retains socket pressure imprints as inspection evidence that their die-formed and machined crests have fulfilled their purpose and have been displaced. These and other objectives will be apparent with more description to follow but it is timelier to address the relative cost to manufacture the invention.

Reduced Manufacturing Cost

A side benefit from the helical pin trough design is that it can serve as a hydraulic pressure vent for any sealant entrapped within the pin threads and it is cost effective to machine or thread roll a helical trough on the new pin than to grind five axial flutes onto prior art. However, cost saving obtained from a simpler design for the die-formed collar of the new invention is compelling.

The operation to make all of the three collar types of prior art require the use of a bulky and obsolescent screw machine or a costly, multi-die, progressive header fitted with heat. The same concern may include the new collar, so far described, but a simplified version adds market appeal to mechanical advantages. A simplified version of the crested duplex collar of the current invention can be formed and pierced on a header no larger than now makes sleeves for lockbolts of popular tradition. The important change replaces the step on the out-of-round collar barrel for another that is without step and is smooth to facilitate the plastic flow of material as a header machine pierces the hole.

A separate drilling operation, therefore, is avoided and investing capital outlay for a large multi-die header machine to produce a stepped barrel is unnecessary.

Function, however, is more important than appearance so the duplex feature will not be abandoned and only delayed until subsequently executing the light machining operation to change die-formed collar crests from parallel to angular. Light machining to alter the middle collar barrel proceeds as expected but continued machining, thereafter, to a diameter that removes just the tip of the crests at the end of the barrel, restores the appearance of a duplex collar. Possible alteration of function is manageable and claims for the duplex collar are sustained.

BRIEF DESCRIPTION OF THE DRAWINGS

The present invention, already described, now will be enhanced with drawings of a preferred embodiment intended to define a unique fastener system but without limiting the invention.

FIG. 1a selects pin 1 and collar 3 from FIG. 1 for side views and a top plan view of the collar. The pin 1 shows a continuous, helical, left hand trough 13 crisscrossing right hand threads 12 and the collar shows the crests 35 of the middle barrel machined from parallel to angular.

FIG. 3 enlarges the top plan view in FIG. 1a, emphasizes the crests 38 & 38a of the duplex collar and shows how the several diameters and center points relate to each other.

FIG. 3a shows a side view and die-formed linear relationships of the three collar barrel portions 30, 31 and 32.

FIG. 3b presents an alternate form of the top end barrel of the collar but with crests not machined from parallel to angular.

FIG. 5 repeats the forward, cutaway, face end plan of the installation tool of FIG. 1 showing, within their cases 5 and 6, the nested arrangement of twin sockets 7 and 8.

FIG. 5a is a face-end representation of the tool in FIG. 1, pointing to the floating property of the internal socket sub-assembly within the external assembly. The drawing also shows the twin sockets aligned and symmetric so that their internal ramps 73 & 85 are aligned.

FIG. 5b is an enlarged face view of the twin sockets in FIG. 5a presenting the neutral relationship between the divided cavities of the sockets and their forward ramps 73 and 85 separated by a working angle of 30 degrees. A hint 87 is the amount of end barrel crest material that will be redistributed.

Figure 1:
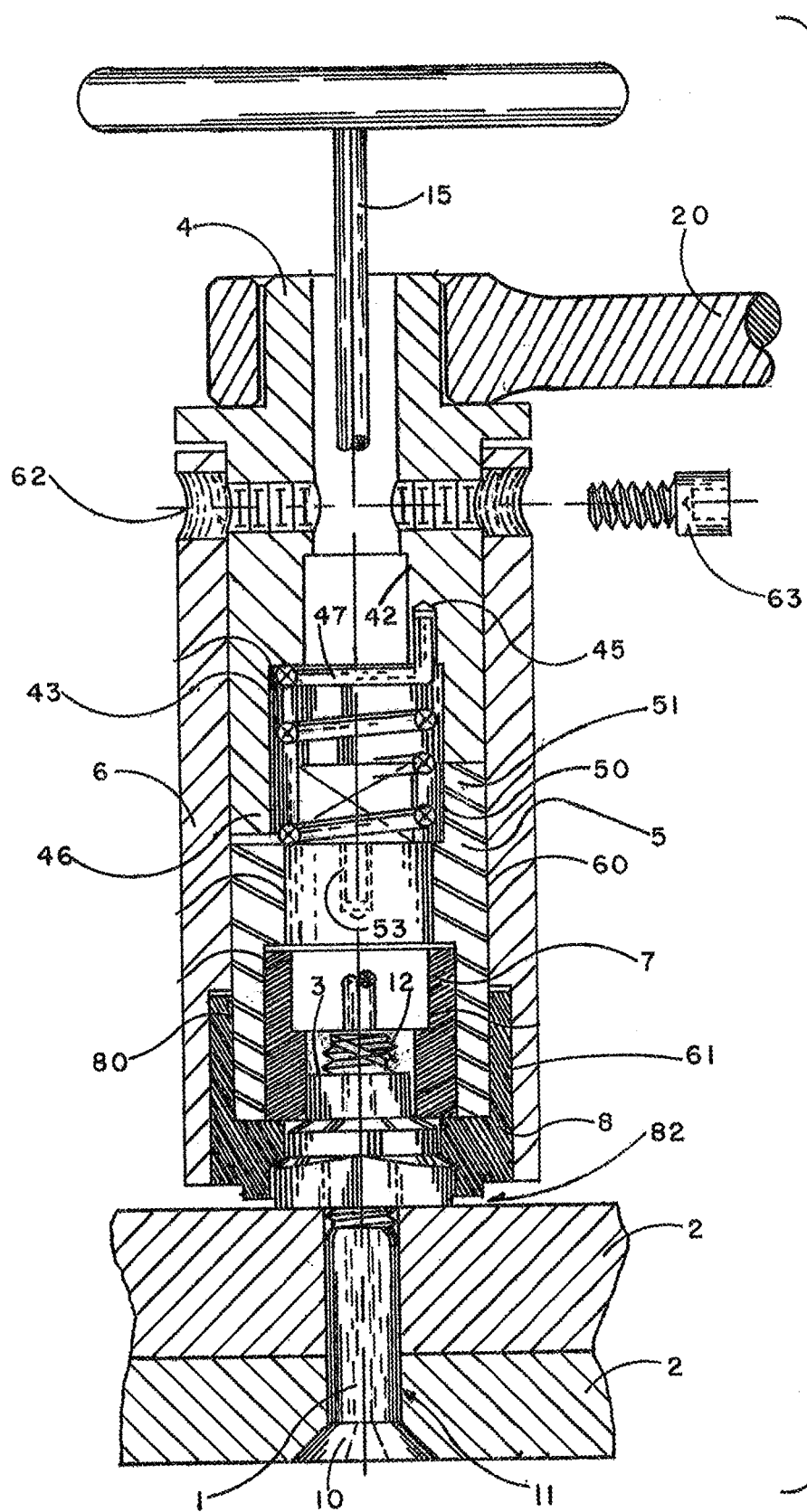
FIG. 1 is a comprehensive sectional view illustrating a locking fastener system including a two-step installation tool and side views of pin 1 and collar 3 of the present invention.

FIG. 6 is a repeat of FIG. 5a but shows a face view of the external socket only and how the circular arcs 82 join the ramps 85 and cutaway to the shoulder 83 of the socket.

FIG. 6a is a cutaway side view of the external socket showing a counter-bore 80 designed to receive the internal die sub-assembly 5 of FIG. 8.

FIG. 6b is a face end view of the external socket of FIG. 6a.

FIG. 7 is the adapter portion 4 of an exploded perspective of the installation tool of FIG. 1 and emphasizes a peg 46 on the forward end projecting beyond spring chamber 43.

FIG. 7a presents a spring 47 surrounding a hollow mandrel 9 both of which are components of the adapter 4 in FIG. 7.

FIG. 8 is a perspective view of the internal socket sub-assembly 5 including a rearward peg 51 that cooperates with the forward peg 46 of the adapter 4.

FIG. 9 is a perspective view of the exterior socket assembly 6 that has a deep rearward chamber 60 to fit over the internal die sub-assembly 5 and the adapter 4.

FIG. 10 shows a comprehensive side view of the fastener assembly with a partial cutaway of the collar end barrel 32, exposing the pin trough 13 and all waiting to be engaged by the installation tool of FIG. 1.

FIG. 10a is a specimen showing the replaceable hexagon recess 14 in the face end of the pintail and allowing for top view comparison of the collar 3 before and after installation.

FIG. 11, as the successfully installed product, shows end results with both middle and top collar barrels 31 & 32 no longer with contoured sides but terminally planar and parallel.

Figure 12:
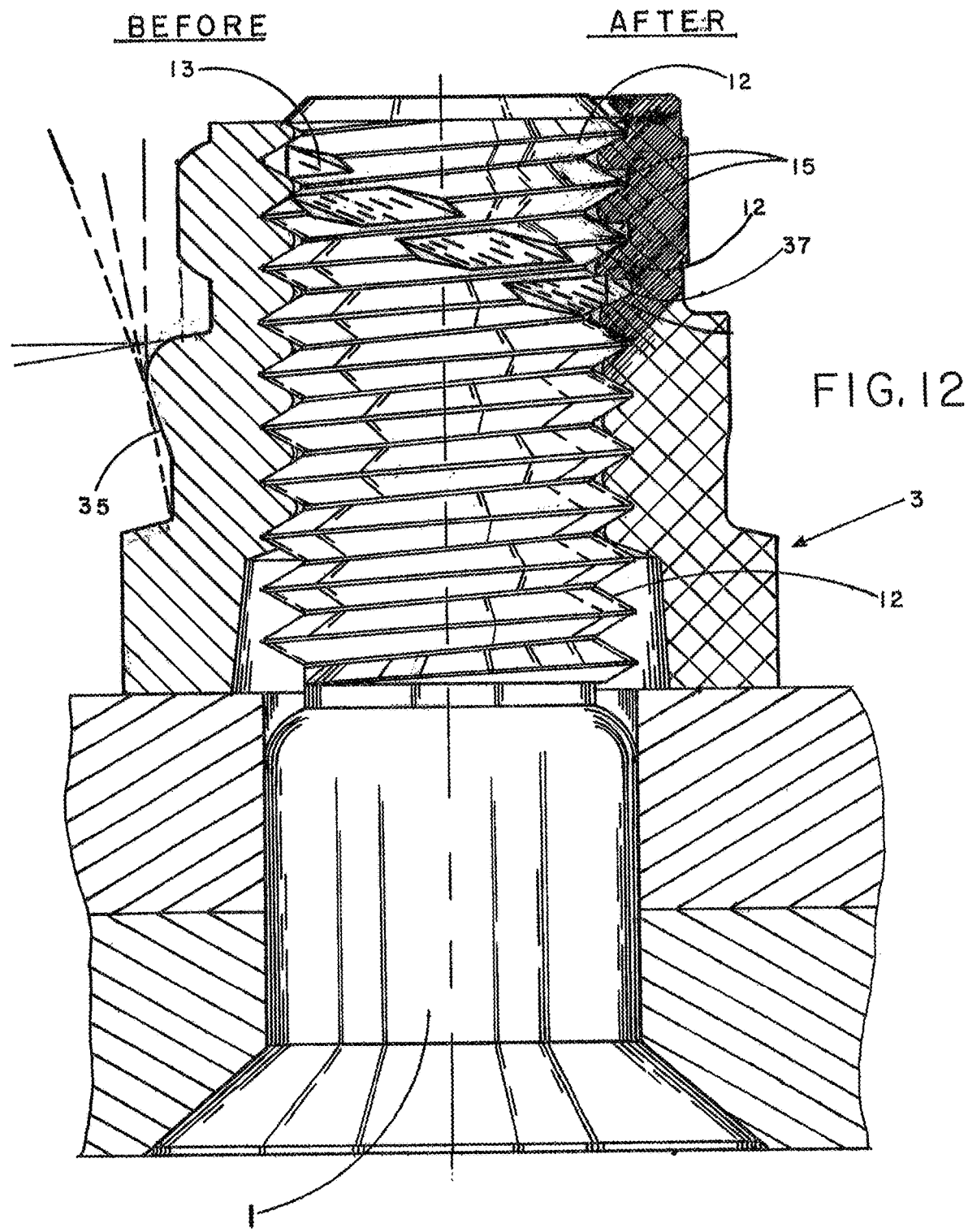

FIG. 12 is a comprehensive but divided sectional view of a successful installation of the preferred version of the fastener; the view on one side of the axis showing the fastener assembly prior to tightening and on the other side of the axis the view after tightening and swaging. The installed view also affords a side look at the pin with sectional awareness of three last collar threads urged forward so that rearward gaps 15 are created between pin threads 12 and collar threads 37.

FIG. 13 is a top end view of the cost saving version of the collar 3 undergoing die-formation. The out-of-round barrel shows major and minor diameters in contrast to the circular forward portion. On the right is the collar, as formed in the first die, and on the left is the result of piercing the hole 37a in the second die.

FIG. 14 shows the middle barrel 31 machined as usual to a flat bottomed groove 34 adjoining a slanted angular rise of about 20 degrees to intersect the barrel crest. The other groove 34a follows unchanged, but the operation includes clipping the crests from the end barrel to a predetermined diameter D.

FIG. 15 is a sectional view of the collar showing the forward counter-bore 36 and threads 37.

DETAILED DESCRIPTION OF A PREFERRED EMBODIMENT

The System

FIG. 1, augmented by items in FIG. 1a, is largely a cross section of a fastener system in keeping with an embodiment of the present invention that allows, from one side, operations that join and lock materials 2 to a prescribed tightness. The invention comprises a pin or bolt 1, a duplex out-of-round collar or nut 3 and twin sockets 7 and 8 of an installation tool driven by a hand wrench 20. Alternate rotary sources, pneumatic and electric, are anticipated. Shank 11 of pin 1 has a head 10 on one end and right hand helical threads 12 are on the other end. Pin shank 11 is inserted into a hole in materials 2 to start the installation process and pin head 10 fits into one face of material 2. Collar 3 of FIG. 1a, with internal right hand threads 37, is then smoothly screwed onto pin threads 12, the last few of which are crisscrossed by a shallow, left hand helical locking trough 13, winding around pin shank 11 for, at least, one full continuous turn.

Collar 3, of FIG. 3a has three barrel portions that are integrated. A larger forward and cylindrical barrel 30 connects to duplex out-of-round barrels: 31 of intermediate size and dovetailing into barrel 32 of smaller size. Flat-bottomed grooves 34 and 34a, machined, connect to forward shoulders 33 and 33a, angled at 20 degrees from radial and to complete the groove 34 parallel middle barrel crests 38 are machined 35 to an angle of 20 degrees from axial, opening rearward. Side 35, alternatively, can be angled at 15 degrees or in between.

Twin sockets 8 and 7 fit over collar barrels 31 and 32 respectively and alternative rotary sources, pneumatic and electric, equally can activate twin sockets 8 and 7, first to tighten and then to lock collar 3 onto pin 1. Shapes and dimensions of collar barrel portions 31 and 32 affect the terminal clamp up load required, as well as security of the lock that will keep collar 3 from unwinding when vibration tested.

Each fastener of a given diameter size, by custom, is identified by a "dash number" relating to its grip length or to the maximum thickness of the associated workpiece. For example: −4 gives the fastener grip length in increments of $\frac{1}{16}^{th}$ of an inch i.e. (0.0625) established by an equation expressed as 4×0.0625=0.250 inch.

Figure 4B:
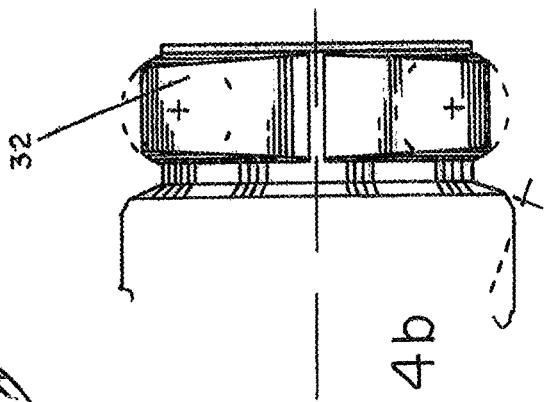
FIG. 4b is a side view of an alternate top end collar barrel portion 32 with sides not machined angular.
Figure 4A:
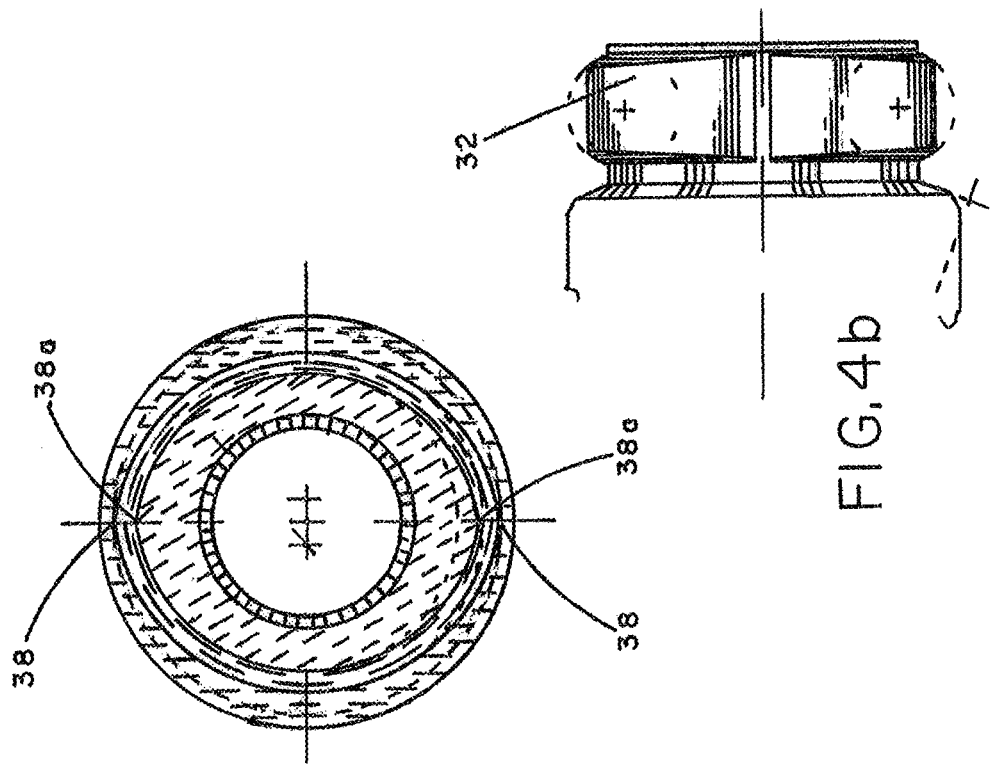
FIG. 4a is a top view of the collar portions—both circular and out-of-round.
Figure 4:
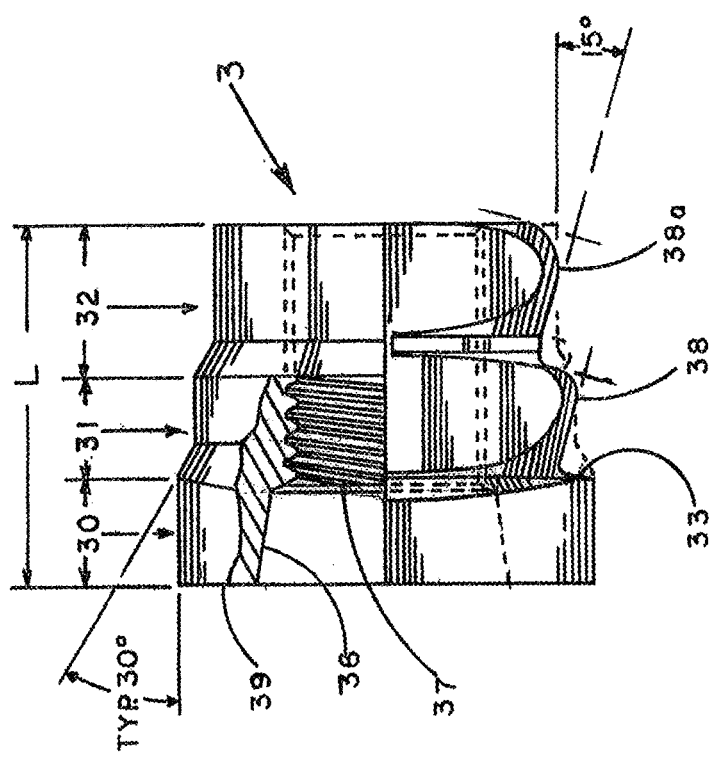
FIG. 4 is a split side view of the collar with one side, as die-formed, and the other, as machined. Linear relations among the barrel portions 30, 31 and 32 are shown and a partial cutaway of front and middle barrels shows a shallow counter-bore 36 followed by a threaded bore 37.

To clamp workpieces 2 together collar 3 in FIG. 4 with internal threads 37 is screwed smoothly onto threads 12 of the pin 1. Collar 3 has a forward face 39 that contacts the workpiece 2 and duplex out-of-round barrels 31 and 32 receive twin sockets 8 and 7 respectively of the installation tool. The larger tool socket 8 of FIG. 5 and fitted to the middle collar barrel 31, works first to tighten the joint to a predetermined load and collar 3 grows increasingly reluctant as tightening progresses. Elevated torque then advances socket 8 around collar barrel 31, displacing material and causing the smaller socket 7 on the end barrel 32 to recoil.

Applied tangential torque dips to frictional value after reaching maximum and displacing reshaped collar crest material 38 rearward and circumferential. Socket 7 then stops recoiling and the locking phase of the installation process begins. So coming to life the smaller socket 7 crushes reshaped end barrel material 38a and by upsetting portions of threads 37, straddling pin trough 13, creates disarray of the underlying structure and thereby locks pin to a collar that resists unwinding when vibration tested.

The Pin

Figure 2:
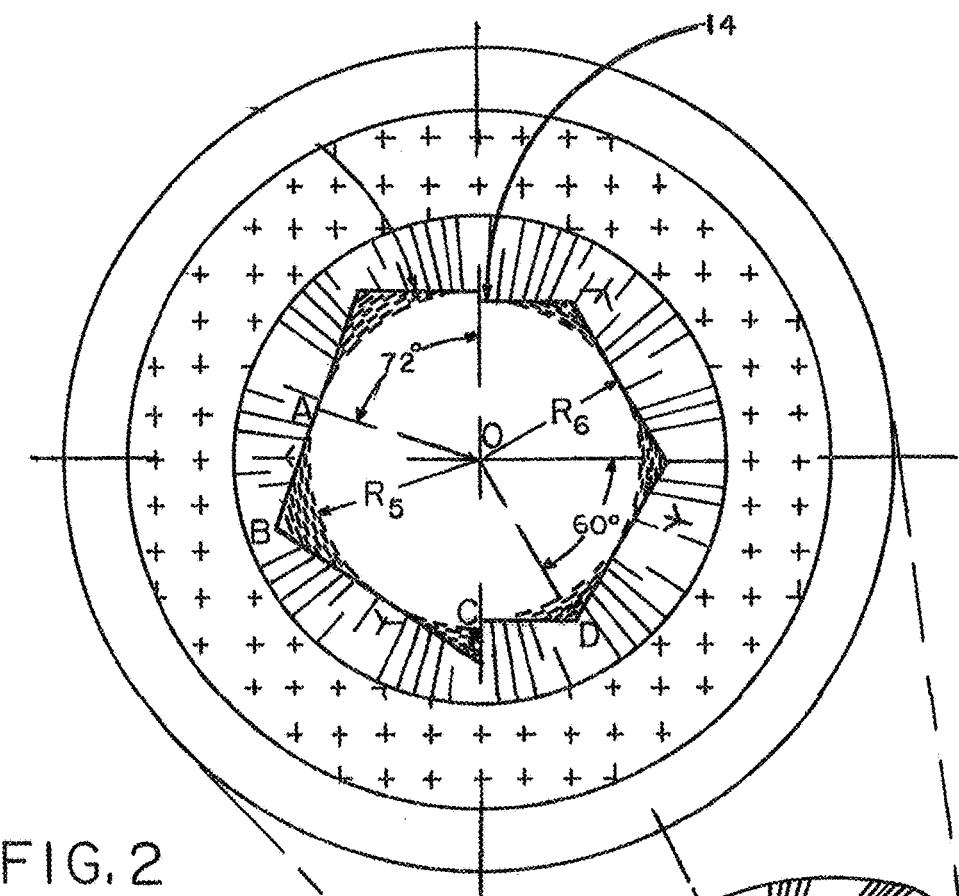
FIG. 2 presents a top view comparison of the polygon faces within the pintail recess. The view on the right shows a portion of the existing hexagon design and the replacement pentagon view is on the left. The change of a polygon shape from hexagon to pentagon is not only simple but increases the cross-section area of the key by five percent and opening the diameter of the pintail recess by only 0.004 inch for the 0.250" diameter pin adds a total of 18 percent of area for a stronger key.
Figure 2A:
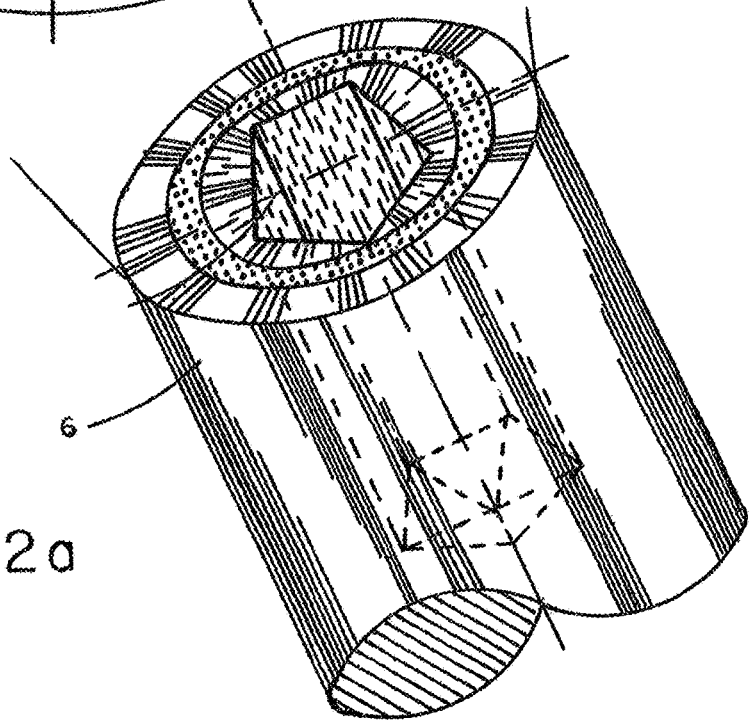
FIG. 2a shows a perspective detail of the new pentagon recess.

The fastener, or pin 1, has a standard head 10 on one end of a smooth shank 11 and shows in the face of the other end an axial recess 14, shaped to receive a restraining polygon sided key 15 that is traditionally hexagon but now reduced beneficially to pentagon as shown in FIG. 2a. Helical right hand threads occupy the tail end portion of pin shank 11 and a continuous left hand, helical locking trough, or groove 13, crisscrosses the last few pin threads 12. Threads and trough advance in opposite directions, such that right hand threads are interrupted by a left hand trough and vice versa. Walls of the trough 13 match the lay of the pin threads 12 and the root width is about equal to one-half of a thread pitch. The trough pitch is a whole number that is much coarser than the thread pitch; for example, if the thread pitch is 0.250-28 pitches per inch, the ideal trough pitch is 0.250-8.

Crisscrossing and truncating hardened pin threads 12, to a fraction of their standard height, the locking trough 13 then becomes repository for a pattern of residual pin thread stumps that will be etched onto the ductile collar threads 37 when tool socket 7 swages collar barrel 32. In other words the locking trough 13 on pin shank 11 is an obstacle course for entrapping collar threads 37, thereby to defeat unwinding. But U.S. Pat. No. 4,867,625 issued to Dixon seems to claim priority for a pin with a helical locking groove.

The Dixon idea, however, belongs to the unthreaded, pull-push genre of fasteners installed by cumbersome hydraulic powered tools, not generally adapted to hand application and usually carted around on wheels. On the other hand the present invention is of the more versatile and rotary type of threaded fasteners designed to be driven by hand-wrenches as well as pneumatic and electric power sources.

Moreover, the Dixon system appears confusing by referring to a flute that supposedly locks pin and collar together, yet is laboriously "streamlined and smooth" to facilitate unwinding the collar after installation. Furthermore, the pitch of the flute on the pull-type pin of the Dixon invention is not coarser but identical and blends with pin rings adapted from annular so as to work like helical threads. Therefore the uniqueness of the unstreamlined, coarse-pitched and opposite advancing direction of the locking trough of the present invention is sustained.

The Collar

The collar of FIG. 3a shows three contiguous body portions. A larger forward and cylindrical portion 30 is integrated to duplex, out-of-round barrels that are aligned and middle barrel 31 is larger than end barrel 32. Two grooves that do not create a frangible neck of material distinguish one barrel portion from another and they have forward sides 33 and 33a angled at about 20 degrees from radial. Those forward sides terminate at flat bottoms 34 and 34a and the flats 34 connect to their complementary sides 35 that were die-formed axial, as collar crests 38, but machined angular to about 20 degrees from axial. Such constraint is applicable to collar material of steel but may fall short of load specification for titanium or aluminum. But decreasing to 15 degrees the angle of the complementary side 35a (FIG. 3b) elevates torque when collar barrel 31 is tightened and 10 degrees may be extreme.

A face 39 occupies the forward end of collar 3 and concentric bores FIG. 4 define the inside of the collar showing a shallow counter-bore 36 in the forward end and a threaded bore 37 rearward thereof. Freely engaging the threads FIG. 10 of the matching pin 1, inserted into a hole drilled into workpieces 2, the collar meets resistance when it contacts the workpiece.

Machine-slanted sides 35 of collar barrel 31 make the collar flexible and adaptable to dimensional fine tuning on the manufacturing floor, therefore, rendering it inexcusable to manufacture scrap. Interaction between the slanted side 35 of the collar and the interrupted circular cavity 82 of the installation socket 8 also combats the tendency of the socket to "cam-off" before accomplishing the tightening operation. Another benefit of the slant on side 35 is to help to displace collar material a shorter distance, axial and circumferential, instead of going entirely circumferential on the longer route around the collar apex.

Finally, and in association with the problem of environmental corrosion, the shorter travel distance traversed by material displaced from collar crests 38 now preserves or reduces loss of a corrosion resistant coating on the collar.

The Twin Socket Installation Tool

To tighten the joint, a tool with nesting twin sockets FIGS. 5-6b engages the collar to transmit tangential torque FIG. 6b delivered by the forward ramps 85 of FIG. 6 connected to the smooth arcs 82 within the external socket 8 on the middle collar barrel 31. Sockets work in tandem fashion with one of each pair of internal surfaces 79 and 82 of FIG. 5b dedicated to a lobe on the duplex collar barrels. The pair of ramps 85, inside the cavity of the larger external socket 8, are inclined at an angle of about twelve degrees to transmit tangential torque and the inclined ramp pair 73, within the cavity of the smaller internal socket 7 is about six degrees to increase the radial component of torque. Torque rises as the interface lines of the paired ramps 85, connecting the arcs 82 within the larger cavity of the socket 8, simultaneously press against slants 35 of the middle barrel 31 and tightens the collar that rotates progressively slower after contacting the workpiece 2. But slower collar rotation finds socket 8 advancing and burnishing collar material that flows axially rearward and circumferential and causing the smaller socket 7 on the end barrel 32 to recoil.

At maximum applied torque the collar eventually comes to rest and since dissipation of transported material and plunging torque terminate the tightening process the smaller socket 7 ceases to recoil. A second rise of force, with radial torque increased and tangential torque decreased, then finds the paired ramps 73 within the cavity of the smaller socket 7 compressing the end barrel portion 32 of the collar 3, displacing and deforming all threads within the vicinity of the pin trough 13 and locking pin to collar while redistributing, to roundness, material on the collar barrel 32. Inspection of locking quality can be adjudicated by deciding a terminal range of diameter values for the swaged collar portion.

The Recoiling Process

Enough has been said about reliable twin sockets of a novel tool working on duplex barrel portions of a threaded collar screwed onto matching threads on the shank of a headed pin inserted into a hole in materials to be joined in two steps; first to tighten and then to lock pin to collar. The single socket of prior art systems does not encourage certainty that the two installation operations will be executed in the proper sequence all of the time, hence the shortfall that the twin sockets in FIGS. 5 & 5a correct. Novelty comes from allowing the smaller socket 7, nesting in the larger 8, to recoil through a limited angle of idleness and then become active only after the companion socket 8 fulfills its initial obligation. A coil spring 47 connecting the twin sockets of FIGS. 7 & 8, under tension, controls the delay between operations and confines tangential strain to the tightening process so that the locking event, to follow, develops no added torsion that would over-burden the hex key.

FIGS. 7-9 show three sub-assemblies that work together to facilitate recoil. The adapter 4 of the sub-assembly in FIG. 7 shows a top end to be driven by torque delivered by a hand ratchet 20 in FIG. 1. The other forward end of the adapter has bores 43 and 42 providing chambers for a spring 47 surrounding a hollow mandrel 9. The spring has arms 48 extending axially and the rearward arm is arranged to fit into a hole 45 drilled into a shoulder at the bottom of the spring chamber 43. The mandrel 9 is optional for a hand tool but facilitates putting together the sub-assemblies of FIGS. 7, 8

& 9. Spring chamber 43 has three quadrants of its wall partially removed and retains one quadrant 46 as a peg.

FIG. 8 shows the internal socket sub-assembly encasing the smaller socket 7 press-fitted within the forward end and with case outside diameter that matches the diameter of the adapter. One half of a cutaway chamber 50 in the rear end matches the spring chamber 43 of the adapter and the resulting peg 51, covering two quadrants, cooperates with the adapter peg 46. The two chambers, together, restore the missing wall portion cut away from the spring chamber 43, but not fully. One quadrant is still missing to facilitate recoil and, drilled into a shoulder 55 that bottoms the chamber 50 within the case 5, a hole 53 receives the other spring arm 48 under tension.

Finally, to complete the novelty of recoil, the outer socket sub-assembly FIG. 9 with socket 8 press-fitted into the forward end of the case 6, has a deep chamber 60 to slide over the sub-assemblies FIGS. 8 & 7 and holes 62 for setscrews 63 that will anchor the sub-assemblies to the adapter. Other methods for anchorage can be contemplated and are within the scope of the invention.

The Polygon-Faced Pin Recess

Improvements, provided by the smart twin sockets, confidently render the traditional hexagon recess in the tail of the pin and the mating key of the tool now adequate for installations in metallic structures. Hex key failure can be laid to rest and nagging concern discontinued. Friction between pin head and workpiece, in tension application unchanged, will continue to be more than enough to arrest the pin and render the hex key almost redundant. But reduced friction in shear application will no longer lead to depletion of the counter-torque capacity of the hex key. Nevertheless, whatever remains for cushion may be not quite enough to satisfy liquid seal application in composite material; therefore, something better than a hex key to finalize the invention will be required. A pentagon shape is not only simple, but has faces 25 percent wider for grabbing and a sectional area five percent larger for strength than their hexagon equivalents. Such gains are small and insufficient but can be augmented by opening the orifice in the tail of the 0.250 diameter (–4) pin by 0.004 inch for a combined strength increase of 18 percent. The aggregate of such fine tuning then creates The Omnitite™ Self-locking Fastener System system that satisfies the toughest demand and, as the alternative to prior art, can reduce warehouse inventory for both manufacturer and customer.

Modifications and variations of the embodiments described above may be made by those skilled in the art while remaining within the true scope and spirit of this invention. For instance, a polygon faced recess in the pintail may be substituted for a spline or some other form. Accordingly then, the scope of this invention is intended to be defined only by the claims that follow.

What is claimed is:

1. A self-locking fastener system comprising:
 a pin or bolt having a plurality of threads extending in a first direction and a trough crisscrossing at least one of the plurality of threads in a second direction different than the first direction;
 a collar or nut having a threaded portion configured to thread onto the plurality of threads of the pin or bolt, the collar or nut having a cylindrical barrel portion at a distal end of the collar or nut, an intermediate barrel portion having a smaller width than the cylindrical barrel portion, and a proximal barrel portion having a smaller width than the intermediate barrel portion, the intermediate barrel portion axially interposed between the cylindrical barrel portion and the proximal barrel portion, each of the intermediate and proximal barrel portions having an out-of-round shape and having a pair of lateral crests; and
 an installation tool extending from a proximal end to a distal end and configured to be driven by a hand wrench, the tool having
  an adapter having a first circumferential wall defining a first chamber that houses a spring, the adapter extending from a proximal portion that defines the proximal end of the installation tool and a first peg at a distal end of the adapter that projects past the first chamber and extends circumferentially along less than an entire circumference of the first circumferential wall,
  an internal socket sub-assembly having a second circumferential wall defining a second chamber, the internal socket sub-assembly extending from a second peg at a proximal end that projects past the second chamber and extends circumferentially along less than an entire circumference of the second circumferential wall and a first socket at a distal end of the internal socket sub-assembly, the internal socket sub-assembly and the adapter arranged along a same axis so that the first and second chambers align and so that side surfaces of the first and second pegs are generally parallel to each other, and
  an exterior socket assembly having a third circumferential wall defining a third chamber configured to receive the internal socket sub-assembly and at least a portion of the first circumferential wall, the exterior socket assembly extending from a proximal end and a second socket at a distal end of the exterior socket assembly, the exterior socket assembly configured to extend over the internal socket sub-assembly and over at least a portion of the adapter and to fixedly couple to the adapter, wherein the first and second sockets are nested and extend along the axis and the second socket has a larger opening than the first socket, and wherein the first socket is spring loaded axially relative to the second socket and is configured to recoil angularly relative to the second socket,
 wherein the installation tool is configured to engage the collar or nut such that the second socket extends over the intermediate barrel portion and so that the first socket extends over the proximal barrel portion, and wherein rotation of the installation tool about the axis causes the second socket to exert a torque on the intermediate barrel portion to threadably tighten the collar or nut onto the pin or bolt while the first socket recoils and disengages from the proximal barrel portion, and wherein following said tightening of the collar or nut onto the pin or bolt such that the collar or nut resists further tightening, the first socket engages and exerts a torque on the proximal barrel portion to thereby compress the proximal barrel portion to displace and deform at least some of the threads of the collar or nut proximate the trough of the pin or bolt to lock the pin or bolt to the collar or nut.

2. The self-locking fastener system of claim 1, wherein the first peg extends circumferentially along a quadrant of the entire circumference of the first circumferential wall.

3. The self-locking fastener system of claim 1, wherein the second peg extends circumferentially along two quadrants of the entire circumference of the second circumferential wall.

4. The self-locking fastener system of claim 1, wherein the first socket is configured to recoil angularly approximately 90 degrees.

5. A self-locking fastener system, comprising:
- a bolt having a plurality of threads extending in a first direction and a trough crisscrossing at least one of the plurality of threads in a second direction different than the first direction;
- a nut having a threaded portion configured to thread onto the plurality of threads of the bolt, the nut having a cylindrical barrel portion at a distal end of the nut, an intermediate barrel portion having a smaller width than the cylindrical barrel portion, and a proximal barrel portion having a smaller width than the intermediate barrel portion, the intermediate barrel portion axially interposed between the cylindrical barrel portion and the proximal barrel portion, each of the intermediate and proximal barrel portions having an out-of-round shape; and
- an installation tool extending from a proximal end to a distal end, the tool having
  - an adapter having a first circumferential wall defining a first chamber that houses a spring, the adapter extending from a proximal portion that defines the proximal end of the installation tool and a first peg at a distal end of the adapter that projects past the first chamber and extends circumferentially along less than an entire circumference of the first circumferential wall,
  - an internal socket sub-assembly having a second circumferential wall defining a second chamber, the internal socket sub-assembly extending from a second peg at a proximal end that projects past the second chamber and extends circumferentially along less than an entire circumference of the second circumferential wall and a first socket at a distal end of the internal socket sub-assembly, the internal socket sub-assembly and the adapter arranged along a same axis so that the first and second chambers align and so that side surfaces of the first and second pegs are generally parallel to each other, and
  - an exterior socket assembly having a third circumferential wall defining a third chamber configured to receive the internal socket sub-assembly and at least a portion of the first circumferential wall, the exterior socket assembly extending from a proximal end and a second socket at a distal end of the exterior socket assembly, the exterior socket assembly configured to extend over the internal socket sub-assembly and over at least a portion of the adapter and to fixedly couple to the adapter, wherein the first and second sockets are nested and extend along the axis and the second socket has a larger opening than the first socket, and wherein the first socket is spring loaded axially relative to the second socket and is configured to recoil angularly relative to the second socket,
wherein the installation tool is configured to engage the nut such that the second socket extends over the intermediate barrel portion and so that the first socket extends over the proximal barrel portion, and wherein rotation of the installation tool about the axis causes the second socket to exert a torque on the intermediate barrel portion to threadably tighten the nut onto the bolt while the first socket recoils and disengages from the proximal barrel portion, and wherein following said tightening of the nut onto the bolt such that the nut resists further tightening, the first socket engages and exerts a torque on the proximal barrel portion to thereby compress the proximal barrel portion to displace and deform at least some of the threads of the collar proximate the trough of the pin to lock the bolt to the nut.

6. The self-locking fastener system of claim 5, wherein the first peg extends circumferentially along a quadrant of the entire circumference of the first circumferential wall.

7. The self-locking fastener system of claim 5, wherein the second peg extends circumferentially along two quadrants of the entire circumference of the second circumferential wall.

8. The self-locking fastener system of claim 5, wherein the first socket is configured to recoil angularly approximately 90 degrees.

* * * * *